(12) United States Patent
Mack et al.

(10) Patent No.: US 7,431,789 B2
(45) Date of Patent: Oct. 7, 2008

(54) COVALENTLY COMPATIBLE IN-MOLD COATING COMPOSITIONS FOR USE WITH EPOXY

(75) Inventors: Patrick E. Mack, Milford, MA (US); Mitchell D. Smith, Abingdon, VA (US)

(73) Assignee: VRAC, LLC, Providence, RI (US)

( * ) Notice: Subject to any disclaimer, the term of this patent is extended or adjusted under 35 U.S.C. 154(b) by 396 days.

(21) Appl. No.: 10/891,584

(22) Filed: Jul. 14, 2004

(65) Prior Publication Data
US 2005/0048214 A1    Mar. 3, 2005

Related U.S. Application Data

(60) Provisional application No. 60/487,219, filed on Jul. 15, 2003.

(51) Int. Cl.
*B29C 70/06* (2006.01)
*B32B 27/08* (2006.01)

(52) U.S. Cl. .................. 156/245; 264/241; 264/255; 264/257; 427/133; 525/39; 525/44; 525/48

(58) Field of Classification Search ................ None
See application file for complete search history.

(56) References Cited

U.S. PATENT DOCUMENTS

| 4,916,023 | A | * | 4/1990 | Kawabata et al. ........... 428/482 |
| 6,268,464 | B1 | | 7/2001 | Keinanen |
| 2005/0159551 | A1 | | 7/2005 | Mack |

FOREIGN PATENT DOCUMENTS

| EP | 1 078 964 A | | 2/2001 |
| JP | 2003138032 | * | 5/2003 |

OTHER PUBLICATIONS

Encyclopedia of Polymer Science and Engineering; vol. 1 p. 234; 1985.*
Lee; "Handbook of Epoxy Resins" 1973, p. 7-1 to 7-3.*
Sartomer Technical Data Sheets for SR415 and SR-350, no date.*

* cited by examiner

*Primary Examiner*—David Buttner
(74) *Attorney, Agent, or Firm*—Brian M. Dingman; Mirick O'Connell; DeMallie & Lougee

(57) ABSTRACT

A covalently-compatible in-mold gelcoat composition for use with epoxy matrix resins, including fiber-reinforced substrates, wherein the gelcoat composition comprises an acrylate ester component. Also disclosed is a process for using such composition.

19 Claims, 1 Drawing Sheet

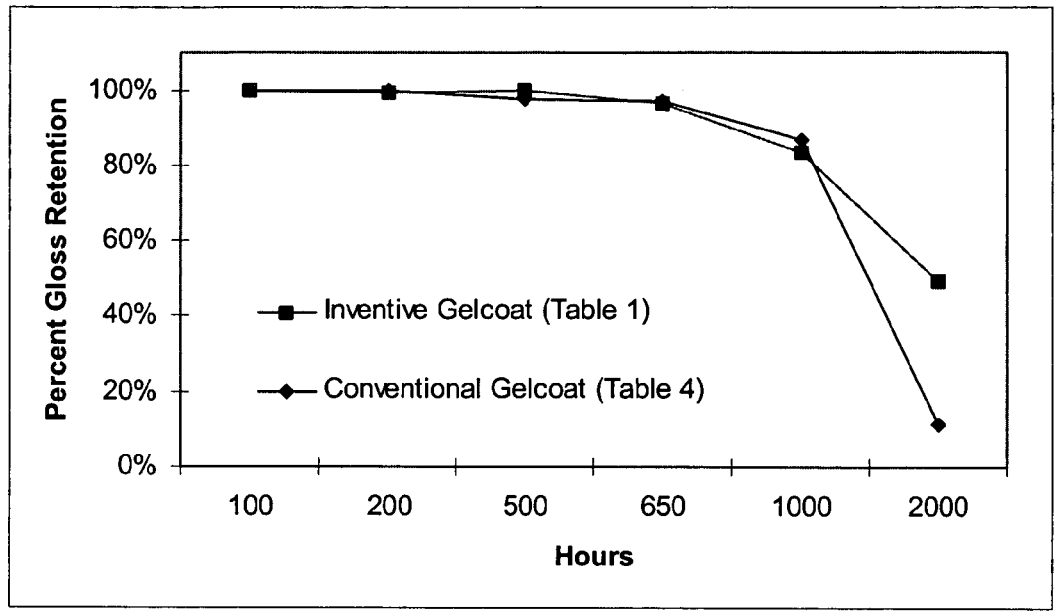
Figure 1. 60 Degree Gloss Retention versus Time. (ASTM G155 Cycle 1)
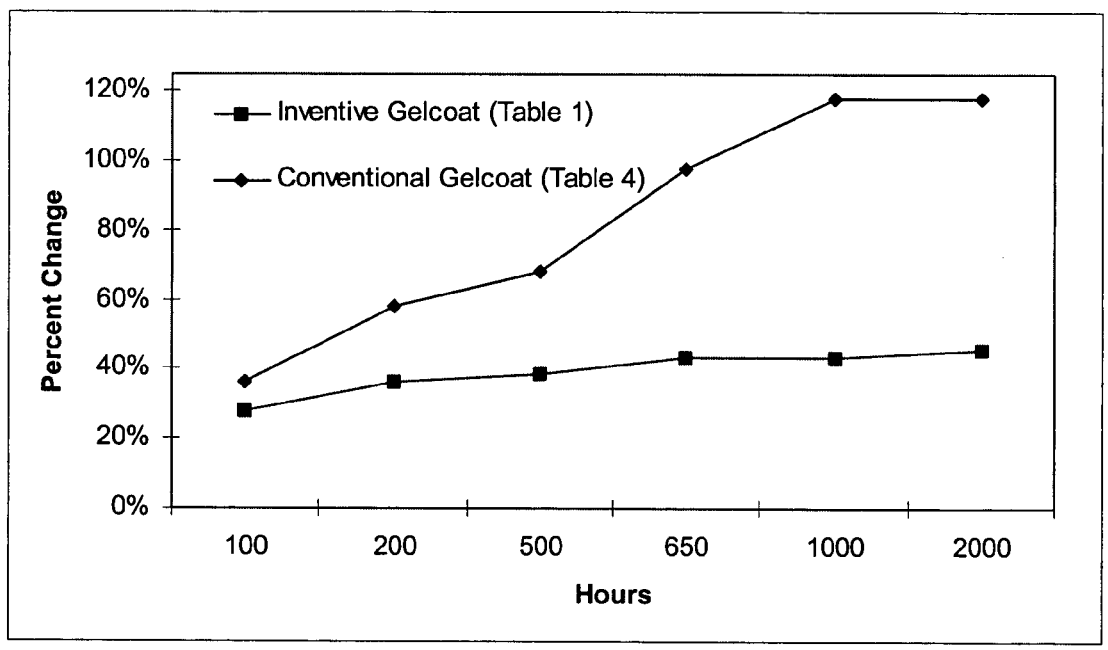
Figure 2. Yellowness Index Percent Change versus Time. (ASTM G155 Cycle 1)

COVALENTLY COMPATIBLE IN-MOLD COATING COMPOSITIONS FOR USE WITH EPOXY

CROSS REFERENCE TO RELATED APPLICATION

This application claims priority of Provisional application Ser. No. 60/487,219, filed on Jul. 15, 2003.

FIELD OF THE INVENTION

The present invention relates to a thermosettable in-mold gel coating (gelcoat) composition for epoxy (matrix resin) molded plastic (composite) articles.

BACKGROUND OF THE INVENTION

Fiber reinforced (matrix) resin composite articles take many shapes and forms in applications ranging from bathtubs to aircraft. Typically in the construction of these shapes and forms fibers are laid into an open mold of the desired shape. This dry fiber reinforcement is then wet out with the matrix resin using manual or instrumented techniques, and the matrix resin is allowed to cure to form the fiber reinforced matrix resin composite to the desired shape. The resulting composite article is then removed from the mold for use.

In circumstances where it is desirous to provide a durable and/or aesthetic surface to the article being manufactured, an in-mold coating capable of forming a primary covalent interfacial bond with the chosen matrix resin system is employed. This in-mold coating is typically applied by manual or instrumented spray techniques onto the mold surface prior to application of the fibers and/or resin. In order to achieve said covalent interfacial bonding the matrix resin is applied to the in-mold coating prior to completion of the in-mold coating's cure. Those fluent in the art will recognize such an in-mold coating as a gelcoat, so named for this pre-cured gel state.

The ability of the gelcoat to provide a primary bond at the critical coating-matrix interface lends a distinct advantage over the application of a coating secondary to the composite article's construction, where bond strength is dictated by the coating system's adhesive qualities. Further, in gelcoated articles aesthetics are derived from the surface quality of the mold in use. Thus, in aesthetically demanding articles, such as boat hulls, aesthetic-finishing labor is associated with the fabrication of the master from which the mold is made. Where multiple like parts are being manufactured from the same mold, this represents a tremendous cost savings over secondary coating where aesthetic-finish labor is associated with the individual article. Other advantages to the use of a gelcoat over a secondary coating are readily apparent to those fluent in the art.

Gelcoats for composite articles are generally multi-component formulations consisting of a base resin system having incorporated therein various fillers, pigments, and other additives. While the selection of these constituents plays an important role in determining the end properties of the gelcoat and its suitability for a given application, the selection of the base resin system dictates the overall end use performance of the gelcoat as a whole. Lending themselves to the requisite demands of durability and aesthetics, to a large extent it is well known that unsaturated ester-based polymers are conventionally utilized as the primary backbone in composite gelcoat systems. These ethylenically unsaturated polyester resins are typically used together with a reactive diluent, usually an unsaturated organic monomer. The unsaturated organic monomers are selected such that they co-polymerize through room temperature free-radical cure with the polyester resin to form the gelcoat. As generally used in the past, exemplar unsaturated organic monomers include styrene, alpha-methylstyrene, vinyltoluene, and divinyl-benzene. Thus gelcoats of this convention are by their nature designed to form interfacial covalent bonds with ethylenically unsaturated matrix resin systems such as polyester and vinylesters.

Although ethylenically unsaturated matrix resins are effectively employed, epoxy matrix resins have a broad range of physical properties, mechanical capabilities and processing conditions that make them invaluable by comparison for many applications. Depending on the chemical structures of the epoxy resin and the co-reactant, modifying reactants chosen, and the conditions of cure, it is possible to obtain toughness, chemical and solvent resistance, mechanical responses ranging from extreme flexibility to high strength and hardness, resistance to creep and fatigue, excellent adhesion to most fibers, heat resistance, low cure related shrinkage, and excellent electrical properties. The uncured epoxy resins have a variety of physical forms, ranging from low-viscosity liquids to tacky solids, which, combined with the large selection of curing agents, affords the composite fabricator a wide range of processing options.

While articles manufactured with epoxy matrix resins may benefit from the use of a gelcoat, previously, covalently compatible in-mold coatings with the requisite durability and aesthetic characteristics has not been available. The mutual exclusivity of the curing mechanisms associated with that of the conventional gelcoat, and more specifically the conventional ethylenically unsaturated monomers used in said gelcoats, and the curing mechanisms of epoxy matrix resins, makes them incompatible. Further, due to extinction of the free radical by oxygen, conventional gelcoats do not cure to completion in atmosphere.

Thus prior art has dictated the use of a tie coat between the conventional gelcoat and the epoxy matrix resin. The tie coat is designed to be covalently compatible with the conventional gelcoat, while curing to completion to provide an interface for secondary bonding of the epoxy matrix resin. Disadvantages associated with the use of said tie coat include increased cost to the final part in application time, increased production cycle time, increased material costs and increased article weight. Further, the mechanical integrity at the critical coating-matrix interface is subject to the adhesive qualities of the epoxy matrix resin employed.

Accordingly, in light of the above discussion, the prior art has faced the problem of finding an acceptable gelcoat for direct application to epoxy matrix fiber-reinforced composites.

In these respects, the use of a gelcoat composition for epoxy (matrix resin) molded plastic (composite) articles according to the present invention substantially departs from the conventional concepts and designs of the prior art.

SUMMARY OF THE INVENTION

An object of the present invention is to provide a technique that will overcome the shortcomings of the prior art.

Another object of the present invention is to provide a composition of matter that is exemplary of the types of materials that may be used in formulation of an in-mold gel coating (gelcoat) that is covalently compatible with epoxies.

Other objects and advantages of the present invention will become obvious to the reader and it is intended that these objects and advantages be within the scope of the present invention.

In view of the foregoing disadvantages inherent in the known techniques for providing a durable and/or aesthetic surface to epoxy (matrix resin) molded plastic (composite) articles now present in the prior art, the present invention provides a new gelcoat composition that is covalently compatibility with epoxy resin, and a method of using such composition.

The general purpose of the present invention, which will be described subsequently in greater detail, is to provide a new technique and an application of materials for the formulation of gelcoats that have many of the advantages gelcoats heretofore and many novel features.

To attain this, the present invention generally comprises the use of (meth)acrylate ester functional resins and compositions there-of in formulating gelcoat compositions for covalent compatibility with epoxy systems through Michael addition via the active hydrogen of the epoxy co-reactant with the (meth)acrylate ester.

In a broad sense the term epoxy refers to a chemical group consisting of an oxygen atom bonded with two carbon atoms already united in some other way. Thus all epoxies contain the epoxide, oxirane, or ethoxylene group:

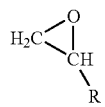

Where in R represents the point of attachment to the remainder of the resin molecule.

The epoxide function is usually a 1,2- or α-epoxide that appears in the form:

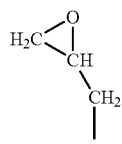

called the glycidyl group, which is attached to the remainder of the molecule by an oxygen, nitrogen, or carboxyl linkage, hence, the terms glycidyl ether, glycidyl amine, or glycidyl ester.

In general, many epoxies for composite matrix resin application are derivatives of the reaction products of epichlorohydrin and bisphenol A; the reaction giving the diglycidyl ether of bisphenol A and higher molecular-weight species. The ideal structure of the resin is:

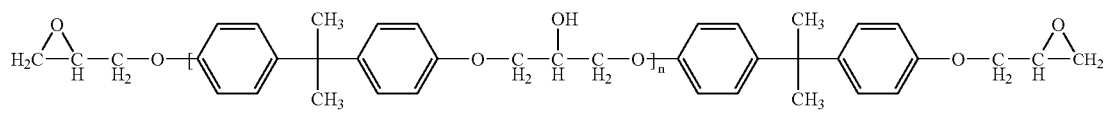

These epoxy resins are readily converted to the thermoset phase upon the admixture of the proper co-reactants. Commonly, curing of the resin results from the reaction of the epoxide group with compounds that contain reactive hydrogen atoms:

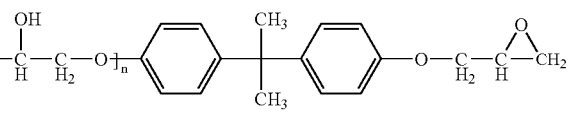

Where R'—H is:

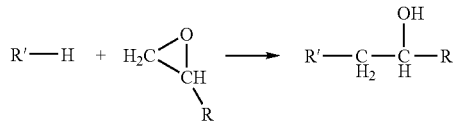

And where R' may be aromatic or aliphatic; linear, branched, or cyclic, alkane, ether or ester; mono, di or multifunctional.

(Meth)acrylate ester functional monomers and oligomers of the present are summarized schematically as:

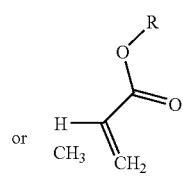

Where R may be aromatic or aliphatic; linear, branched, or cyclic, alkane, ether, ester, acrylic, or urethane; mono, di or multifunctional.

The Michael addition of the (meth)acrylate ester with the active hydrogen of the epoxy co-reactant (one or more amine components) is described schematically in Scheme 1.

Scheme 1.
Michael Addition Polymerization Reaction

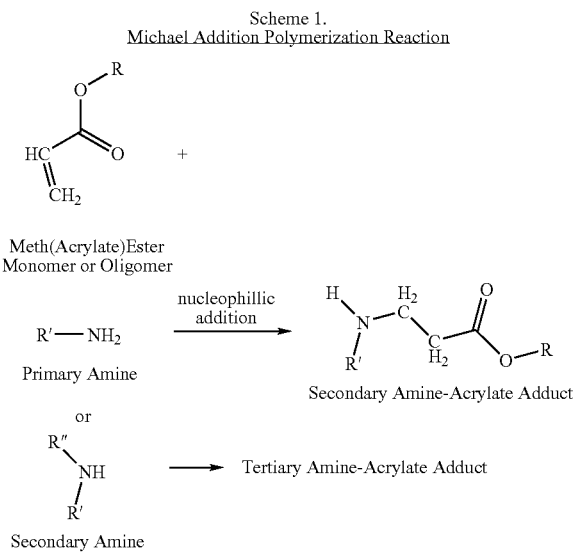

The resulting amine-(meth)acrylate ester adducts will then react with other (meth)acrylate ester molecules and react with the epoxy resin, ultimately forming a highly cross-linked polymer as described in Scheme 2.

Scheme 2.
Amine-(meth)Acrylate Ester Reaction with Epoxies

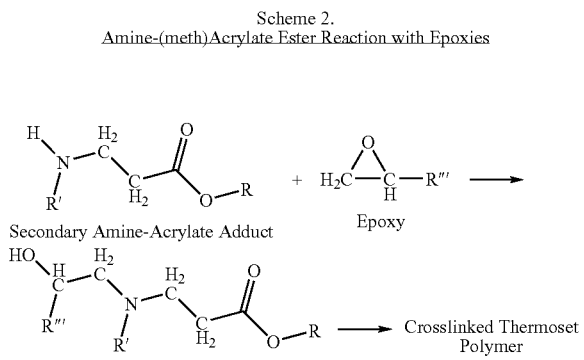

(Meth)acrylate esters can be reacted with a number of amine co-reactants such as aliphatic amines, cycloaliphatic amines, amidoamines, and polyamides. However, aliphatic amines are preferred due to their abundance of primary amine hydrogen. Amine-based epoxy curing agents based on diethylene triamine, triethylenetriamine and tetraethylenepentaamine are the most effective and hence a preferred embodiment of this invention.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

This invention features a covalently-compatible in-mold gelcoat composition for use with epoxy matrix resins, including fiber-reinforced substrates, wherein said gelcoat composition comprises an acrylate ester component. The epoxy matrix resin preferably comprises an amine component. The acrylate ester component may comprise a methacrylate component. The acrylate ester component may comprise a methacrylated isobornyl component. The gelcoat composition may comprise at least two different acrylate components. The gelcoat composition may comprise acrylate or methacrylate ester components having from 2 to 4 carbon atom alkyl substituent radicals depending thereon, coupled with a 5 to 10 carbon atom containing mono or dicyclic alkyl or alkenyl ester radical, and carrying in turn one or more optional alkyl substituents of from about 1 to 3 carbon atoms.

The covalently-compatible in-mold gelcoat composition may further comprise a gelcoat base resin. The gelcoat base resin may comprise an unsaturated polyester component.

Also featured in the invention is a process for forming a molded plastic substrate comprising an epoxy matrix resin base comprising an amine component to which is covalently bound an in-mold exterior gelcoat composition comprising an acrylate ester component, the process comprising providing a layer of the gelcoat, allowing the gelcoat to partially cure such that it is tacky, and applying over the partially-cured gelcoat the epoxy matrix resin base, to achieve a covalent bond between the base and the gelcoat.

The epoxy matrix resin preferably comprises an amine component. The acrylate ester component may comprise a methacrylate component. The acrylate ester component may comprise a methacrylated isobornyl component. The gelcoat composition may comprise at least two different acrylate components. The gelcoat composition may comprise acrylate or methacrylate ester components having from 2 to 4 carbon atom alkyl substituent radicals depending thereon, coupled with a 5 to 10 carbon atom containing mono or dicyclic alkyl or alkenyl ester radical, and carrying in turn one or more optional alkyl substituents of from about 1 to 3 carbon atoms.

The covalently-compatible in-mold gelcoat composition may further comprise a gelcoat base resin. The gelcoat base resin may comprise an unsaturated polyester component.

BRIEF DESCRIPTION OF THE DRAWINGS

Various other objects, features and attendant advantages of the present invention will become fully appreciated, as the same becomes better understood when considered in conjunction with the accompanying drawings, in which:

FIG. 1 is a comparative plot of the percent gloss retention of the gelcoat of this invention compared to a conventional gelcoat; and FIG. 2 is a comparative plot of the yellowness index of the gelcoat of this invention compared to a conventional gelcoat.

DETAILED DESCRIPTION OF THE PREFERRED EMBODIMENTS

The invention may be accomplished in a covalently-compatible in-mold gelcoat composition for use with epoxy matrix resins, including fiber-reinforced substrates, wherein said gelcoat composition comprises an acrylate ester component. The epoxy matrix resin preferably comprises an amine component. The acrylate ester component may comprise a methacrylate component.

Example and Testing Results

Gelcoat formulations were prepared according to this invention utilizing a Conn Blade Intensive Type w/Teeth (ITT) a medium/high shear dispersion mixer rotating at 1,000 RPM. Spray evaluation was conducted utilizing a standard ES Gelcoat Cup Gun with a No. 6 tip and an operating pressure of 50 psi. The low quantity required per application via the cup gun, ~1 quart for the cup gun, vs. ~1 gallon for the production gun, and the rapid change time per formulation, make it a more suitable tool for evaluations. Previous experience has shown good correlation between the cup gun and the production gun in terms of gelcoat application.

An optimized gelcoat formulation prepared according to this invention is shown in Table 1. Note that while this example follows convention in selecting an unsaturated polyester base, it departs from convention in the selection of the reactive diluents in accordance with the invention.

TABLE 1

GELCOAT FORMULATION EXAMPLE 1

| Constituent | Component | MFG | Parts/wt. |
|---|---|---|---|
| Base Resin | Unsaturated Polyester | Bayer | 100 |
| Reactive Diluent Hardness | Isobornyl Methacrylate (IBXMA) | San Esters | 63.33 |
| Reactive Diluent Flexible, Low Shrink | Ethoxylated Trimethylpropane Triacrylate (SR415) | Sartomer | 50 |
| Oligomer Gloss, Impact | Urethane Methacrylate Oligomer (CN1963) | Sartomer | 25 |
| Reactive Diluent Fast Cure Response | Trimethylpropane Trimethacrylate (SR350) | Sartomer | 16.66 |
| UV Stabilizer | Tinuvin 50/50 | Ciba | 2.5 |
| Promotion Package | n,n-Dimethylacetoacetamide (DMAA) | Eastman | 3.75 |
| | Polycure 503 (cobalt/potassium complex) | OMG | 1.26 |
| Free Radical Stabilizer Package | Phenothiazine: IBXMA (1:200) 97 ppm | Verdant | 5 |
| | Hydroquinone: IBXMA (1:100) 100 ppm | Verdant | 2.5 |
| Thixotropic Agent | Fumed Silica (Aerosil ® 200) | Hul | 6 |
| Filler | Wollastonite Clay (Nyglos ® 8) | Nyco | 26.83 |
| Pigment | Titanium Dioxide White Dispersion (CF-1004) | Plasticolors | 13.33 |
| Initiator | Methyl ethyl ketone peroxide (DHD-9) | Atofina | 2% total |

This formulation was sprayable. The physical properties of the gelcoat were then quantified as follows. Thick (0.125") samples were prepared for testing by casting. The test matrix is shown in Table 2, and the results of testing are shown in Table 3. As a comparative, published data from conventional gelcoats (Steve Sleight, *Modern Boatbuilding Materials and Methods* (International Marine Publishing Company, 1985), p.54.) is presented as well.

TABLE 2

PROCEDURES FOR MECHANICAL/PHYSICAL TESTING

| Properties | Unit | Test Method |
|---|---|---|
| Sprayability | Observation | ES-Cup Gun |
| Gel Time | Min. | ASTM2471-99* |
| Tack Time | Min. | ** |
| Tensile strength | Psi | ASTM D638 |
| Tensile elongation | % | ASTM D638 |
| Tensile modulus | Psi | ASTM D638 |
| Flexural strength | Psi | ASTM D790 |
| Flexural modulus | Psi | ASTM D790 |
| % Deflection | % | ASTM D790 |
| Hardness, Barcol | 934-1 | ASTM D2583 |
| Heat distortion temp. | ° F. | ASTM D648 |

*Standard Test Method for Gel Time and Peak Exothermic Temperature of Reacting Thermoset Resins.
**A standard "tack test" is simply to press a thumb onto the coating. If after removing the thumb an imprint is left but without removing the resin (which would now be on the thumb), then the coating has reached its tack time. If the thumb does not leave a print, this is past the tack time. The laminating process should begin prior to passing the tack time to insure formation of a covalent bond between the gelcoat and the substrate laminate. However, if the laminate is applied prior to reaching the tack time, the laminate may be pressed through the then "too soft" pre-tack-time coating.

TABLE 3

Mechanical/Physical Performance Comparative

| Property | Inventive Gelcoat Table 1 | Conventional Gelcoats | Unit |
|---|---|---|---|
| Gel Time | 10 | 8 | Min. |
| Tack Time | 180 | 45 | Min. |
| Tensile strength | 6,720 | 8,267 | psi |
| Tensile elongation | 3.8 | 2.9 | % |
| Tensile modulus | 246,500 | N/A | psi |
| Flexural strength | 9,730 | 12,328 | psi |
| Flexural modulus | 312,200 | 522,136 | psi |
| % Deflection | 13.1 | N/A | % |
| Hardness, Barcol | 35 | 35-40 | 934-1 |
| Heat distortion temp. | 180 | 150 | ° F. |

Quantification of the durability/aesthetics of the inventive gelcoat (Table 1) and its subsequent comparison to a conventional gelcoat/tie coat system followed verification of the mechanical and physical performance. This was accomplished by evaluating the Gloss Retention and Yellowness Index of said gelcoats as tested per ASTM G155 Cycle 1 (Q-U-V 102 minutes UV exposure, 18 minutes UV exposure and water spray). Test coupons were fabricated according to the laminate schedules identified in Table 4.

TABLE 4

DURABILITY/AESTHETICS PERFORMANCE COMPARATIVE LAMINATE SCHEDULES

| | Inventive Laminate | | Conventional Laminate | |
|---|---|---|---|---|
| | Constituent | Quantity | Constituent | Quantity |
| Gelcoat | Inventive (Table 1) | 20 mils applied | CCP Polycor ®* Ferro Tiecoat** | 20 mils applied 20 mils applied |
| Skin Coat | 1 oz./ft.² CSM*** | 1 | 1 oz./ft.² CSM | 1 |
| | CPD 2106 Epoxy/9263 Amine**** | 50 wt./% to CSM | CPD 2106 Epoxy/9263 Amine | 50 wt./% to CSM |
| Reinforce- | EQX4015***** | 4 | EQX4015 | 4 |

TABLE 4-continued

DURABILITY/AESTHETICS PERFORMANCE COMPARATIVE LAMINATE SCHEDULES

| | Inventive Laminate | | Conventional Laminate | |
|---|---|---|---|---|
| | Constituent | Quantity | Constituent | Quantity |
| ment | CPD 2117 Epoxy/9263 Amine | 50 wt. % to Reinforcement | CPD 2106 Epoxy/9263 Amine | 50 wt. % to Reinforcement |

*Cook Composites and Polymers Polycor ® 944-W-005 Base White Isophthalic Gelcoat initiated with 2% Atofina DDM-9 methyl ethyl ketone peroxide.
**Ferro Ultra Tiecoat initiated with 1.5% Atofina DDM-9 methyl ethyl ketone peroxide.
***PPG Chopped Strand Mat Fiberglass (e-glass).
****Composite Polymer Design (Epoxical, Inc.) proprietary epoxy resin blends and amine coreactants.
*****Vectorply 40 oz./yd.² quad axial reinforcement w/1.5 oz./ft.² stitch bonded chopped strand mat.

The laminates identified in Table 4 are in ascending order from a plate glass tool surface. Gelcoats were spray applied to the manufacturer specifications via a standard ES Gelcoat Cup Gun at with a No. 6 tip at an operating pressure of 50 psi. The first epoxy laminate ply, or skin coat, was then applied using manual techniques. Those fluent in the art will recognize that the skin coat dually serves to stabilize the gelcoat during application of subsequent reinforcements and as a profiling barrier to the reinforcement. In the case of the inventive laminate, the skin coat was applied upon proper tack of the gelcoat. In the case of the comparative conventional laminate, the skin coat was applied upon full cure of the tie coat, as indicated by a completely tack free surface. The skin coat was then allowed to cure for a period of 12 hours at 77° F. Following cure of the skin coat the reinforcement was applied via manual techniques, allowed to cure at 77° for a period of 12 hours, then post cured at 175° F. for 6 hours.

Coupons from said laminates were prepared according to the requirements of ASTM G155 and subjected to 2,000 hours of testing following Cycle 1. Comparative plots of the Percent Gloss Retention and Yellowness Index derived from the results of this test are presented in FIG. 1 and FIG. 2 respectively.

As indicated in Table 1, above, the preferred embodiments of this invention may employ various acrylate or methacrylate ester components having from 2 to 4 carbon atom alkyl substituent radicals depending thereon, coupled with a 5 to 10 carbon atom containing mono or dicyclic alkyl or alkenyl ester radical, and carrying in turn one or more optional alkyl substituents of from about 1 to 3 carbon atoms. These materials may be added and employed as monomers or as low oligomers of from up to about 2 to 5 monomer units.

This invention may be utilized via conventional techniques by applying the gel coat composition of this invention to a mold surface and applying to the gel coat while in a partially cured tacky state the fiber reinforced substrate and epoxy resin matrix so as to achieve a covalent bond therebetween.

Accordingly, it is to be understood that this invention is defined and limited only by the spirit and scope of the following claims.

What is claimed is:

1. A process for forming a molded plastic substrate comprising:
   providing a mold;
   providing an epoxy matrix resin base comprising an amine component;
   providing a gelcoat composition comprising:
      a base resin comprising an ethylenically unsaturated matrix; and
      a reactive diluent consisting of one or more functional monomers selected from Formula I,

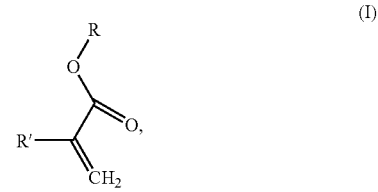

ethoxylated trimethylpropane triacrylate, or trimethylpropane trimethacrylate;
   wherein:
      R is a 5 to 10 carbon atom containing mono- or dicyclic alkyl or alkenyl ester radical having one or more optional alkyl substituents of 1 to 3 carbon atoms, and
      R' is H or $CH_3$;
   applying a layer of the gel coat composition to the mold;
   allowing the gel coat composition to partially cure until it is tacky; and
   applying the epoxy matrix resin base over the partially-cured gel coat composition,
wherein a Michael addition of the acrylate or methacrylate ester component of Formula I and the amine component of the epoxy matrix results in a plurality of amine-acrylate adducts that in turn react with the epoxy matrix resin base to achieve a covalent bond between the epoxy matrix resin base and the gel coat composition, wherein the gel coat provides mechanical and physical performance comparable to conventional gel coats, thereby forming a molded plastic substrate.

2. The process of claim 1, wherein at least one functional monomer of the reactive diluent is a methacrylated isobornyl component.

3. The process of claim 1, wherein the gel coat composition comprises a reactive diluent consisting of at least two different functional monomers of formula I.

4. The process of claim 1, wherein the amine component comprises an aliphatic amine.

5. The process of claim 1, wherein at least one functional monomer of the reactive diluent of the gelcoat is isobornyl methacrylate.

6. The process of claim 1, wherein the base resin of the gelcoat comprises unsaturated polyester.

7. The process of claim 1, wherein at least one functional monomer of the reactive diluent of the gelcoat is ethoxylated trimethylpropane triacrylate.

8. The process of claim 1, wherein at least one functional monomer of the reactive diluent of the gelcoat is trimethylpropane trimethacrylate.

9. The process of claim 1, wherein the reactive diluent of the gelcoat consists of isobornyl methacrylate, ethoxylated trimethylpropane triacrylate, and trimethylpropane trimethacrylate.

10. The process of claim 9, wherein the base resin of the gelcoat consists of unsaturated polyester and urethane methacrylate oligomer.

11. The process of claim 1, wherein the gelcoat composition comprises a base resin consisting of unsaturated polyester and urethane methacrylate oligomer; and reactive diluent consisting of isobornyl methacrylate, ethoxylated trimethylpropane triacrylate, and trimethylpropane trimethacrylate.

12. The process of claim 1, wherein the gelcoat composition consists of a base resin consisting of unsaturated polyester and urethane methacrylate oligomer; a reactive diluent consisting of isobornyl methacrylate, ethoxylated trimethylpropane triacrylate, and trimethylpropane trimethacrylate; a UV stabilizer; a promotion package; a free radical component; a stabilizer package; a thixotropic agent; a filler; a pigment; and an initiator.

13. The process of claim 12, wherein the gelcoat composition consists of a base resin consisting of unsaturated polyester and urethane methacrylate oligomer; a reactive diluent consisting of isobornyl methacrylate, ethoxylated trimethylpropane triacrylate, and trimethylpropane trimethacrylate; a UV stabilizer; a promotion package; a free radical component consisting of phenothiazine: isobornyl methacrylate; a stabilizer package consisting of hydroquinone: isobornyl methacrylate; a thixotropic agent consisting of fumed silica; a filler consisting of wollastonite clay; a pigment consisting of titanium dioxide white dispersion; and an initiator consisting of methyl ethyl ketone peroxide.

14. A process for forming a molded plastic substrate comprising:
   providing a mold;
   providing an epoxy matrix resin base comprising an amine component;
   providing a gelcoat composition comprising:
      a base resin comprising an ethylenically unsaturated matrix; and
      a reactive diluent consisting of one or more functional monomers of Formula I,

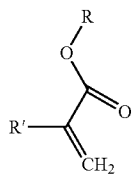

(I)

wherein:
   R is a 5 to 10 carbon atom containing mono- or dicyclic alkyl or alkenyl ester radical having one or more optional alkyl substituents of 1 to 3 carbon atoms, and
   R' is H or $CH_3$;
applying a layer of the gel coat composition to the mold;
allowing the gel coat composition to partially cure until it is tacky; and
applying the epoxy matrix resin base over the partially-cured gel coat composition,
wherein a Michael addition of the acrylate or methacrylate ester component of Formula I and the amine component of the epoxy matrix results in a plurality of amine-acrylate adducts that in turn react with the epoxy matrix resin base to achieve a covalent bond between the epoxy matrix resin base and the gel coat composition, wherein the gel coat provides mechanical and physical performance comparable to conventional gel coats, thereby forming a molded plastic substrate.

15. The process of claim 14, wherein the base resin of the gelcoat comprises unsaturated polyester.

16. The process of claim 14, wherein at least one functional monomer of the reactive diluent is a methacrylated isobornyl component.

17. The process of claim 14, wherein the gel coat composition comprises a reactive diluent consisting of at least two different functional monomers of formula I.

18. The process of claim 14, wherein the amine component comprises an aliphatic amine.

19. The process of claim 14, wherein at least one functional monomer of the reactive diluent of the gelcoat is isobornyl methacrylate.

* * * * *